United States Patent
Jung et al.

(10) Patent No.: US 6,819,800 B2
(45) Date of Patent: Nov. 16, 2004

(54) MOVING IMAGE COMPRESSION/ DECOMPRESSION APPARATUS AND METHOD WHICH USE A WAVELET TRANSFORM TECHNIQUE

(75) Inventors: Woo Young Jung, Seoul (KR); Tae Hoon Kwon, Seoul (KR)

(73) Assignee: Rifatron Co., Ltd., Seoul (KR)

( * ) Notice: Subject to any disclaimer, the term of this patent is extended or adjusted under 35 U.S.C. 154(b) by 649 days.

(21) Appl. No.: 09/826,823

(22) Filed: Apr. 6, 2001

(65) Prior Publication Data

US 2002/0122600 A1 Sep. 5, 2002

(30) Foreign Application Priority Data

Jan. 9, 2001 (KR) .......................................... 2001-1089

(51) Int. Cl.[7] .............................. G06K 9/36; G06K 9/46
(52) U.S. Cl. ............. 382/240; 375/240.11; 375/240.19; 382/238; 382/251
(58) Field of Search ................................. 382/232, 238, 382/239–240, 234, 244, 248, 251; 375/240.03, 240.01, 240.11, 240.12, 240.19

(56) References Cited

U.S. PATENT DOCUMENTS

| 5,235,420 | A | * | 8/1993 | Gharavi | ................ | 375/240.11 |
| 5,412,429 | A | * | 5/1995 | Glover | .................. | 375/240.11 |
| 6,445,823 | B1 | * | 9/2002 | Liang | .......................... | 382/232 |
| 2003/0072494 | A1 | * | 4/2003 | Onno | .......................... | 382/253 |

FOREIGN PATENT DOCUMENTS

| WO | WO 97/16021 | 5/1997 | ............ H04N/7/12 |
| WO | WO 98/36632 | 8/1998 | |

OTHER PUBLICATIONS

Hontsch et al., APIC: Adaptive Perceptual Image Coding Based on Subband Decompositon with Locally Adaptive Perceptual Weighting, Oct. 26–29, 1997, Image Processing, 1997. Proceedings, International Conference on, IEEE, vol. 1, pp. 37–40.*

* cited by examiner

Primary Examiner—Timothy M. Johnson
(74) Attorney, Agent, or Firm—Finnegan, Henderson, Farabow, Garrett & Dunner, LLP

(57) ABSTRACT

A moving image compression/decompression apparatus and method that uses, for example, a wavelet transform technique in order to improve a compression rate is disclosed. The moving image compression/decompression apparatus includes an A/D converter for converting moving image data into digital data. The digital data is divided into a plurality of level regions using a wavelet transformer. The apparatus also includes a quantizer for quantizing the data that has been transform with a predetermined weight that corresponds to each of the regions. The apparatus also includes an SZT coder for performing a lossless DPCM coding with respect to the data quantized sequentially form a high level region to a low level regionusing a similarity between the level regions based on a predetermined SZT map. A Huffman coder for encoding the data subject to SZT coding by the SZT coder based on the probability of high frequency components which exist in each of the level regions, and a stream file generator for outputting the data encoded by the Huffman coder as bit stream.

12 Claims, 4 Drawing Sheets

MOVING IMAGE COMPRESSION/DECOMPRESSION APPARATUS AND METHOD WHICH USE A WAVELET TRANSFORM TECHNIQUE

FIELD OF THE INVENTION

The present invention relates to a moving image compression/decompression apparatus and method, and particularly to a moving image compression/decompression apparatus and method which use a wavelet transform technique so as to improve a compression rate.

BACKGROUND OF THE INVENTION

In recent years, there has been much transmission service of image data or audio data over the internet. Also, in the field of security system, there has been much research on a realtime transmission of stored data as well as data storage.

For this, methods for increasing a transmission rate of a network or transmitting compressed data are proposed. However, in the former method, a transmission rate of a network can not be increased to more than some extent. Moreover, since the transmission rate becomes decreased even in the high speed network when users connected to the network increase, enormous costs and expenses are consumed without remarkable effect. In the latter method, there are various standardized compression methods such as MJPEG (Motion JPEG), MPEG-1, MPEG-2, MPEG-4, or the like. Video on demand (VOD) or realtime service are performed using the compression methods and buffering method. VOD service is not performed in realtime since it uses compressed and pre-stored data, and realtime service performed using the buffering method has problems about system workability and stability when processing is delayed on the reception side, or the transmission rate of the network decreases.

SUMMARY OF THE INVENTION

It is an object of the present invention to provide a moving image compression/decompression apparatus and method for compressing moving image data in high compression rate and transmitting them in realtime through the practical network.

According to a first aspect of the present invention, there is provided a moving image compression/decompression apparatus comprising a A/D converter for converting moving image data into digital data, a wavelet transformer for dividing the digital data converted by the AID converter into a plurality of level regions and wavelet-transforming the divided data, a quantizer for quantizing the data wavelet-transformed by the wavelet transformer with predetermined weight corresponding to each of the level regions, a SZT coder for performing a lossless OPCM coding with respect to the data quantized by the quantizer sequentially from high level region to low level region using a similarity between the level regions based on a predetermined SZT map, a Huffman coder for encoding the data subject to SZT coding by the SZT coder based on the probability of high frequency components which exist in each of the level regions, and a stream file generator for outputting the data encoded by the Huffman coder as bit stream.

According to a second aspect of the present invention, there is provided a moving image compression/decompression method comprising the steps of (a) converting moving image data into digital data, (b) dividing the digital data converted in the stop (a) into a plurality of level regions and wavelet-transforming the divided data, (c) a quantizer for quantizing the data wavelet-transformed in the step (b) with predetermined weight corresponding to each of the level regions, (d) performing a lossless DPCM coding with respect to the data quantized in the step (c) sequentially from high level region to low level region using a similarity between the level regions based on a predetermined SZT map, (e) encoding the data subject to SZT coding in the step (d) based on the probability of high frequency components which exist in each of the level regions, and (f) outputting the data encoded in the step (a) as bit stream.

BRIEF DESCRIPTION OF THE DRAWINGS

The above object and advantages of the present invention will become apparent by describing in details a preferred embodiment thereof with reference to the attached drawings in which.

DETAILED DESCRIPTION OF THE INVENTION

A moving image compression/decompression apparatus and method according to the present invention are based on a wavelet transform method which is being widely used as an image coding method having a good performance.

Wavelet transformation is a new theory which integrates individual technologies developed in the field of signal processing. The wavelet transformation has a large amount of arithmetic operation compared with DCT(Discrete Cosine Transform), but it has both time and frequency component, scalability characteristics, multi-resolution, zero tree coding and control function of quantization rate so as to realize high compression rate and high quality.

In the conventional method similar to the method supposed by the present invention, since significant map is created using self-similarity between wavelet-divided sub-bands (upper band and lower band) so as to transmit the data, all the wavelet-divided regions must be checked. However, in the method according to the present invention, a lossless DPCM(Differential Pulse Code Modulation) is performed with respect to the low frequency band having much image information while SZT coding is performed with respect to the other bands using level similarity. Also, a noise filter to remove a noise included in input image is provided so as to improve compression rate and quality.

An embodiment of the present invention will be described in details with reference to the accompanying drawings.

Figure 1:
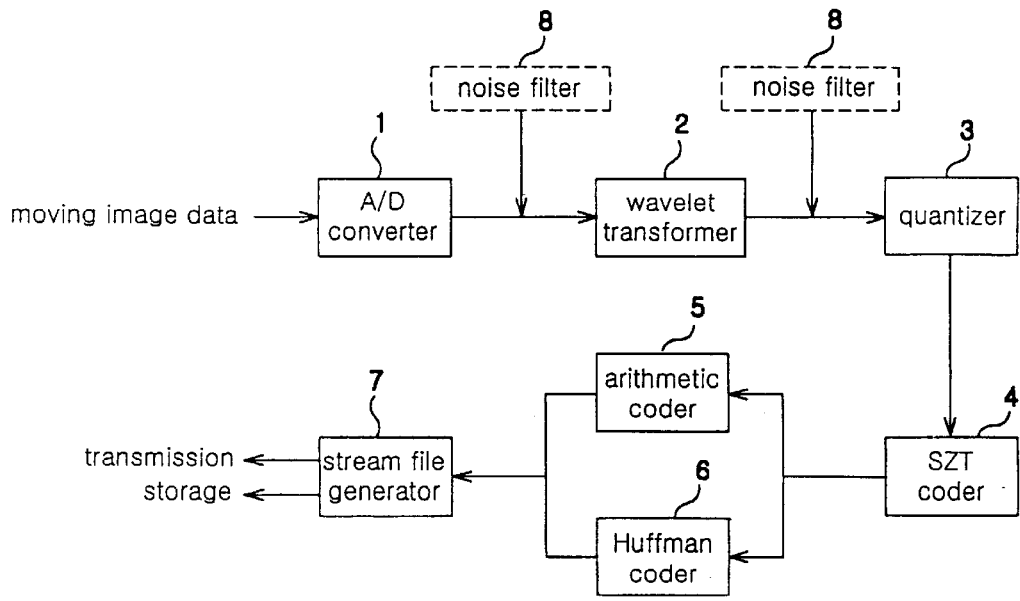
FIG. 1 is a block diagram showing intra-frame encoder.
Figure 2:
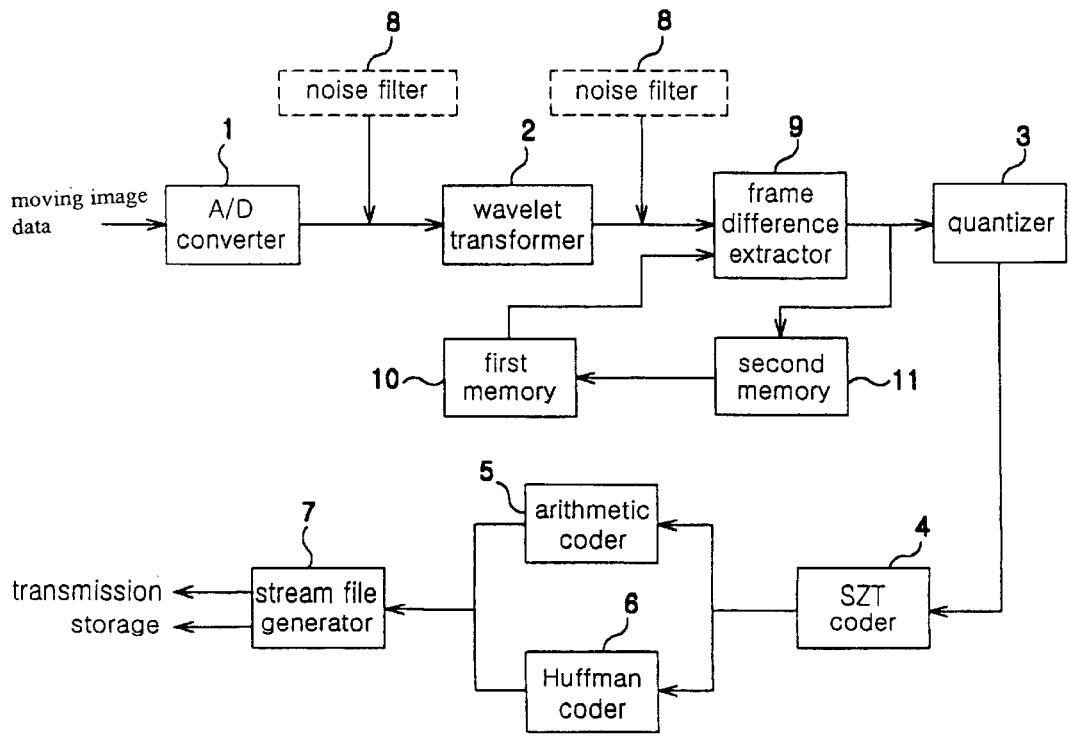
FIG. 2 is a block diagram showing inter-frame encoder.

The encoder according to the embodiment of the present invention is shown in FIG. 1 and FIG. 2. The encoder as shown in FIG. 1 is a intra-frame encoder which allows a high capacity of data to be transmitted with high quality and high speed. The encoder as shown in FIG. 2 is a inter-frame encoder which allows a high capacity of data to be transmitted with high quality and high speed even in the network having low transmission rate.

Note that the same drawing number will be used with respect to the same block of FIG. 1 and FIG. 2.

As shown in FIG. 1, input moving image data are supplied to an A/D converter 1. The moving image data supplied to the A/D converter 1 are converted into digital data in the A/D converter 1. The converted digital data are supplied to a wavelet transformer 2. The wavelet transformer 2 performs wavelet transformation processing with respect to the digital data. Here, noise filters 8, which are provided in an output terminal of the A/D converter 1 and the wavelet transformer 2 respectively, removes a noise included in the moving image data. The wavelet-transformed data are supplied to a quantizer 3 which quantizes them in predetermined method. The quantized data are subject to SZT(Simplified Zero Tree) coding in SZT encoder 4 which will be described later. Thereafter, the SZT coded data are supplied to an arithmetic coder 5 or a Huffman coder 6 which performs its corresponding coding with respect to the SZT coded data. Finally, the coded data are output as bit stream via stream file generator 7 and transmitted through the network or stored in predetermined medium.

In FIG. 2, input moving image data, as described above with reference to FIG. 1, are converted into digital data and wavelet-transformed by the A/D converter 1 and the wavelet transformer 2, respectively. Also, the moving image data are subject to noise filtering by the noise filters 8. Next, the wavelet-transformed data are supplied to a frame difference extractor 9 and compared with data stored in a first memory 10 which have been wavelet-transformed in previous stage. Difference data between the wavelet-transformed data and the data stored in a first memory 10 are stored in a second memory 11 and also are supplied to the quantizer 3. When next wavelet-transformed data are supplied to the frame difference extractor 9, the difference data stored in the second memory 11 are sent to the first memory 10 and compared with the next wavelet-transformed data. Then, other difference data between the next wavelet-transformed data and the difference data stored in the first memory 10 are stored in the second memory 11 and also are supplied to the quantizer 3.

In such a method, difference data are sequentially output from the frame difference extractor 9 and the output difference data finally are transmitted or stored as bit stream via the quantizer 3, the SZT coder 4, the arithmetic coder 5 or the Huffman coder 6, and the stream file generator 7.

Since the inter-frame encoder in FIG. 2 compresses a moving image data by substantially one-third, it can transmit more data than the intra-frame encoder in the same transmission rate.

As described above, the encoders in FIG. 1 and FIG. 2 output bit streams by iterating the above processing.

Figure 3:
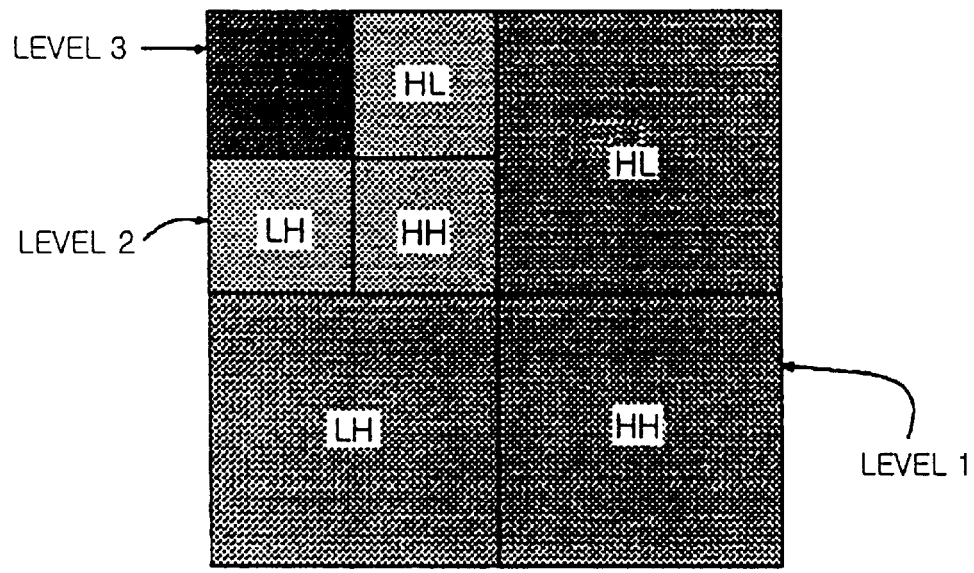
FIG. 3 is a view of three level regions in SZT coding.

SZT coding executed in the SZT coder 4 will be described below with reference to FIG. 3.

When a moving image is input to the encoder, it is subject to the above processing, i.e., A/D conversion, wavelet transform and quantization, and then supplied to the SZT coder 4. An SZT map for storing flag of zero tree is created before SZT coding is performed, for example, with respect to three level regions (level 1 to level 3) in the SZT coder 4. At first, the SZT map has all "0"s.

The level 3 has much information as a high level region which has LL band with high energy. First, a lossless DPCM coding is executed with respect to the level 3 using similarity with high frequency region. The SZT map changes the flag corresponding to coded pixel into "1". At this time, since all the high frequency regions are subject to the lossless DPCM coding, the SZT map for level 3 becomes all "1".

The coding for the level 2 is performed with respect to the pixels corresponding to those of the level 3 only when the SZT map for level 3 is "1". All the pixels of the level 2 are coded since the SZT map for level 3 has all "1". However, in the SZT map for the level 2, when value of coded pixel is more than predetermined threshold, corresponding flag of the SZT map is changed into "1", while that of the SZT map keeps "0" when value of coded pixel is less than predetermined threshold. Accordingly, the SZT map for the level 2 has "0" and "1", so that coding with respect to the level 1 is performed in two ways.

When the SZT map for the level 2 is "0", in accordance with similarity with the level 2, coding is not performed with respect to the corresponding 4 times pixels. On the other hand, when the SZT map for the level 2 is "1", coding is performed in the same method to the above level 2.

The SZT coding is executed by decreasing the number of pixels to be coded using similarity and multi-resolution. In other words, when the SZT map for upper level is "0", corresponding 4 pixels of current level is not coded. Then, in the next level, corresponding 16 pixels of current level is not coded. Although the number of levels is three in the embodiment of the present invention, the more the number of levels increases, the more the number of pixels not to be coded increases.

In the intra-frame encoder, after wavelet-transformed data are quantized in the quantizer 3, the quantized data are subject to the SZT coding. In the inter-frame encoder, after difference data are quantized in the quantizer 3, the quantized difference data are subject to the SZT coding.

The quantizer 3 according to the embodiment of the present invention is a scalar quantizer, and performs dead zone quantization wherein dead zone is two times of step size. Here, a quantization coefficient is as follows.

$$X_q = \text{sign}(X) \cdot \frac{|X|}{\delta}$$

Figure 4:
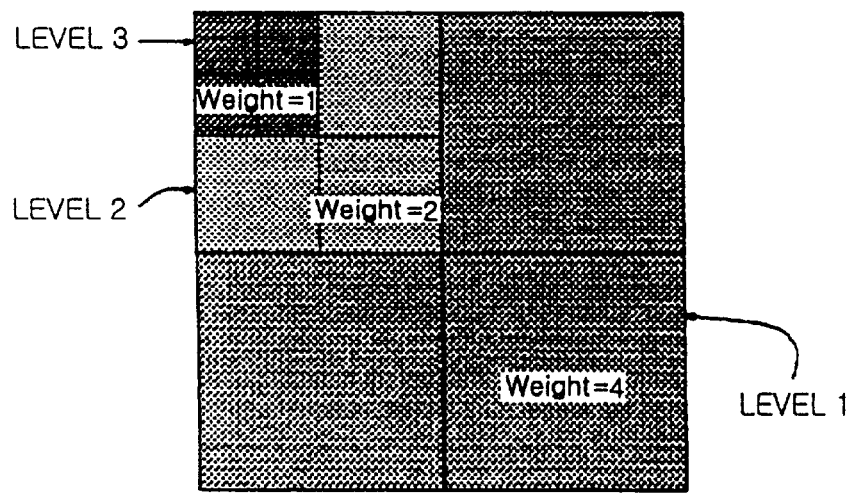
FIG. 4 is a view of three level regions weighted with 1, 2 and 4, respectively, in quantization.

The quantization coefficient is weighted in accordance with the characteristics of wavelet transform. In other words, for example the level 3 is weighted with 1; the level 2 with 2: the level with 4, as shown in FIG. 4. Accordingly, a substantial quantization coefficient is as follows.

$$X'_q = \text{sign}(X) \cdot \frac{|X|}{\text{weight} \cdot \delta} = \frac{X_q}{\text{weight}}$$

The data subject to SZT coding are supplied to the arithmetic coder 5 or the Huffman coder 6. Here, Description for the arithmetic coder 5 is omitted, and the only Huffman coder 6 will be described below.

Figure 5:
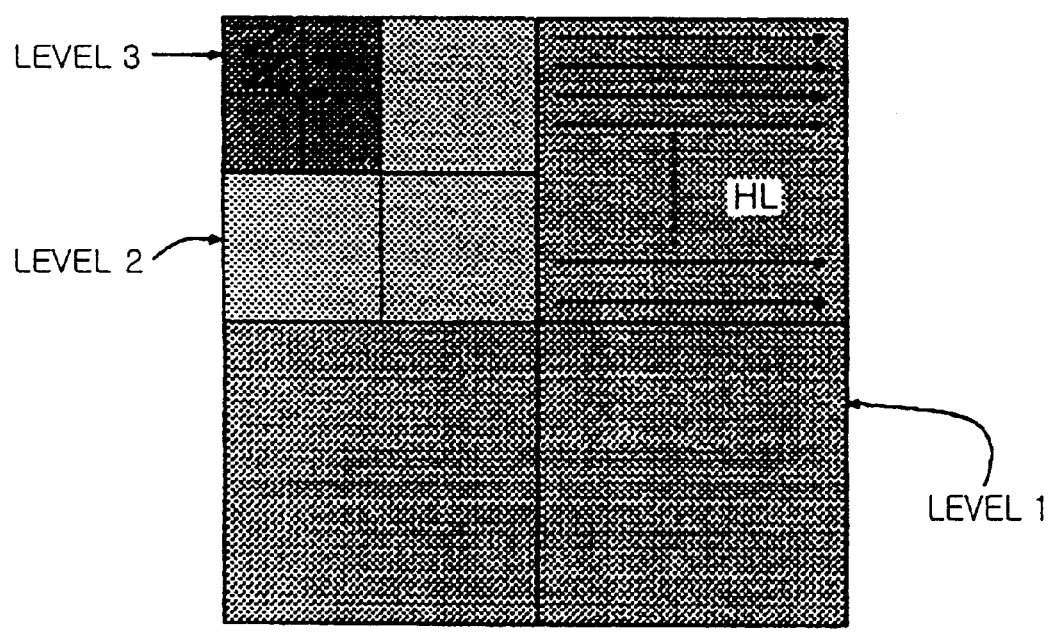
FIG. 5 shows a RLC(run-length coding) procedure in each level region in Huffman coding.

SZT coded data supplied to the Huffman coder 6 are subject to RLC(run-length coding) as a previous processing before Huffman coding In a conventional method, Z-type method is used in level 3 as shown in FIG. 5, while other methods may be used in each level considering the characteristics of wavelet transform in the present invention. In FIG. 5, most of level 1 is composed of high frequency components so that the SZT map for level 1 has substantially "0". Also, each of "HL", "LH" and "HH" in the level 1 has its different characteristics of high frequency component. For example, since the "HH" band of the level 1 has substantially "0", an existence probability for "0" is set to high value so as to encode the data in shortest length. That is, if the existence probability for "0" is 15% in one band, data are encoded into "000" and if 60%, data are encoded into "10". This method obtains a compression efficiency of more than 50% compared with the conventional method. In this case, coded data form is managed corresponding to the level so that coded data are subject to decoding processing in the reception side also corresponding to the level. In the level 2 or 3, the same processing is performed and the only existence probability for "0" is different. Accordingly, the each Huffman probability table is created and managed corresponding to the level. In decoding, the Huffman probability table is used corresponding to each level. In the present invention, RLC procedure before the Huffman coding may be performed from left toward right as shown in the level 1 of FIG. 5 including Z-type method.

The compressed moving image data through the above processing are formed of a bit stream format which supports time search function using time information included therein as data format used in program such as Window Media Player.

Figure 6:
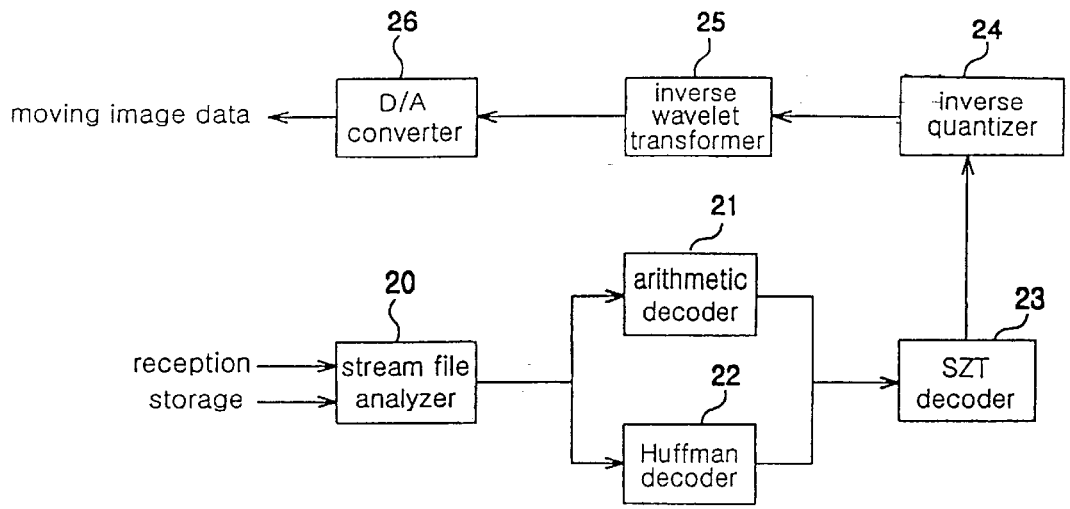
FIG. 6 is a block diagram showing intra-frame decoder.
Figure 7:
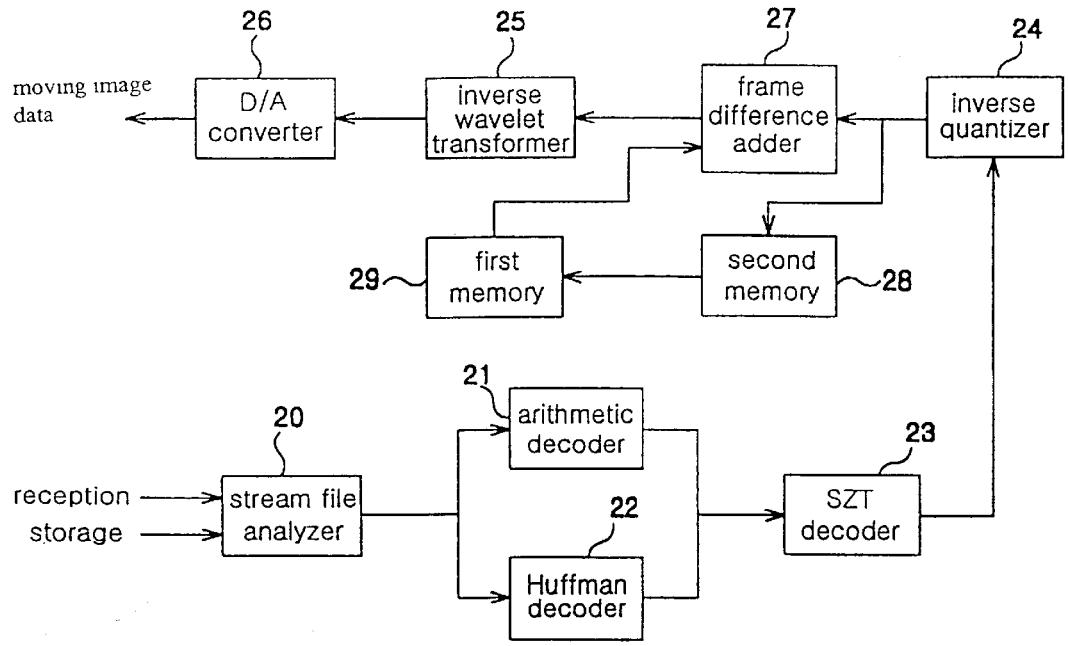
FIG. 7 is a block diagram showing inter-frame decoder.

FIG. 6 and FIG. 7 is a block diagram of intra-frame decoder and inter-frame decoder according to the present invention, respectively. Inverse processing of the above coding, that is decoding is performed using the same method in the intra-frame decoder and inter-frame decoder.

In FIG. 6, compressed moving image data received from the transmission side or stored in predetermined medium are supplied to a stream file analyzer 20 which determines the coding format of bit stream(compressed moving image data). When the coding format of compressed moving image data is arithmetic coding, the data are supplied to a arithmetic decoder 21. On the other hand, when the coding format of compressed moving image data is Huffman coding, the data are supplied to a Huffman decoder 22.

The data decoded in the arithmetic decoder 21 or Huffman decoder 22 are decompressed by the inverse procedure of the coding via a SZT decoder 23, inverse quantizer 24, inverse transformer 25 and D/A converter 26.

In FIG. 7, compressed moving image data received from the transmission side or stored in predetermined medium are supplied to a stream file analyzer 20 which determines the coding format of bit stream. Then, the data are supplied to the arithmetic decoder 21 or the Huffman decoder 22.

The data decoded in the arithmetic decoder 21 or Huffman decoder 22 are supplied to a frame difference adder 27 via the SZT decoder 23 and the inverse quantizer 24. The data supplied to the frame difference adder 27 are simultaneously stored in a second memory 28. The frame difference adder 27 adds data pre-stored in a first memory 29 to the data supplied from the inverse quantizer 24 and outputs the result data to the inverse wavelet transformer 25. At the same time, the data stored in the second memory 28 are sent to the first memory 29. The inverse wavelet transformer 25 performs a inverse transform with respect to the result data and outputs digital moving image data. The output digital moving image data are converted into analog moving image data in the D/A converter 26.

The present invention is not limited to the above embodiment, and it should be understood by those skilled in the art that other changes and modifications may be made without departing from the spirit and scope of the present invention.

According to the present invention, there are provided a moving image compression/decompression apparatus and method which can transmit or store the data 3 to 6 times or more.

In other words, since compression rate increases by minimum 3 times to maximum 6 times or more compared with the conventional method, the compression/decompression apparatus and method according to the present invention are widely applied to the system requiring a large quantity of data such as internet TV, internet video mailing, DVR(digital video recording) or on-line conference system.

What is claimed:

1. A moving image compression/decompression apparatus comprising:
   an A/D converter for converting moving image data into digital data:
   a wavelet transformer for dividing the digital data converted by said A/D converter into a plurality of level regions and wavelet-transforming the divided data;
   a quantizer for quantizing the data wavelet-transformed by said wavelet transformer with predetermined weight corresponding to each of the level regions;
   an SZT coder for performing a lossless DPCM coding with respect to the data quantized by said quantizer sequentially from high level region to low level region using a similarity between the level regions based on a predetermined SZT map;
   a Huffman coder for encoding the data subject to SZT coding by said SZT coder based on the probability of high frequency components which exist in each of the level regions; and
   a stream file generator for outputting the data encoded by said Huffman coder as bit stream.

2. A moving image compression/decompression apparatus according to claim 1, wherein a noise filter is provided in the output terminal of said A/D converter and said wavelet transformer.

3. A moving image compression/decompression apparatus according to claim 1, wherein said SZT coder does not perform a lossless DPCM coding with respect to corresponding 4 times pixels of next level region when the SZT map for present level region is "0", while it performs a lossless DPCM coding with respect to corresponding 4 times pixels of next level region when the SZT map for present level region is "1".

4. A moving image compression/decompression apparatus according to claim 1, wherein after said SZT coder performs a lossless DPCM coding with respect to highest level region, the SZT map for the highest level region which has been initially set to all "0" becomes all "1" and thereafter as it performs the lossless DPCM coding sequentially in order of level, said SZT map for each level region is created in such a method that if the value of a pixel of each level region subject to the lossless DPCM coding is more than a predetermined threshold, the corresponding SZT map becomes "1", while if the value of a pixel of each level region subject to the lossless DPCM coding is less than the predetermined threshold the corresponding SZT map keeps "0".

5. A moving image compression/decompression apparatus according to claim 1, wherein said Huffman coder performs RLC coding in Z-type method or from left toward right with respect to each of the level region.

6. A moving image compression/decompression apparatus according to claim 1, wherein said apparatus further comprises:
   a first memory for storing a first difference data between wavelet-transformed data and previously wavelet-transformed data;

a frame difference extractor for outputting a second difference data between the first difference data stored in said first memory and next wavelet-transformed data;

a second memory for storing the second difference data output from said frame difference extractor, wherein when another next wavelet-transformed data are supplied to said frame difference extractor, the second difference data stored in said second memory are supplied via said first memory to said frame difference extractor, wherein said frame difference extractor outputs n-th difference data sequentially in such a method that it outputs a third difference data between the second difference data and another next wavelet-transformed data.

7. A moving image compression/decompression method comprising the steps of:
(a) converting moving image data into digital data;
(b) dividing the digital data converted in said step (a) into a plurality of level regions and wavelet-transforming the divided data;
(c) a quantizer for quantizing the data wavelet-transformed in said step (b) with predetermined weight corresponding to each of the level regions;
(d) performing a lossless DPCM coding with respect to the data quantized in said step (c) sequentially from high level region to low level region using a similarity between the level regions based on a predetermined SZT map;
(e) encoding the data subject to SZT coding in said step (d) based on the probability of high frequency components which exist in each of the level regions; and
(f) outputting the data encoded in said step (e) as bit stream.

8. A moving image compression/decompression method according to claim 7, wherein said method further comprises the steps of removing a noise in said step (a) and said step (b).

9. A moving image compression/decompression method according to claim 7, wherein in said step (d) a lossless DPCM coding is not performed with respect to corresponding 4 times pixels of next level region when the SZT map for present level region is "0", while the lossless DPCM coding is performed with respect to corresponding 4 times pixels of next level region when the SZT map for present level region is "1".

10. A moving image compression/decompression method according to claim 7, wherein after a lossless DPCM coding is performed with respect to highest level region, the SZT map for the highest level region which has been initially set to all "0" becomes all "1" and thereafter as the lossless DPCM coding is performed sequentially in order of level, said SZT map for each level region is created in such a method that if the value of a pixel of each level region subject to the lossless DPCM coding is more than a predetermined threshold the corresponding SZT map becomes "1", while if the value of a pixel of each level region subject to the lossless DPCM coding is less than the predetermined threshold, the corresponding SZT map keeps "0".

11. A moving image compression/decompression method according to claim 7, wherein RLC coding is performed in Z-type method or from left toward right with respect to each of the level region in said step (e).

12. A moving image compression/decompression method according to claim 7, wherein said step further comprises the steps of:
generating a first difference data between wavelet-transformed data and previously wavelet-transformed data, a second difference data between the first difference data and next wavelet-transformed data and n-th difference data sequentially in such a method.

* * * * *

UNITED STATES PATENT AND TRADEMARK OFFICE
CERTIFICATE OF CORRECTION

PATENT NO. : 6,819,800 B2
DATED : November 16, 2004
INVENTOR(S) : Woo Young Jung et al.

It is certified that error appears in the above-identified patent and that said Letters Patent is hereby corrected as shown below:

Title page,
Item [57], ABSTRACT,
Line 9, "transform" should read -- transformed --.
Line 12, "form" should read -- from --.
Line 13, "regionusing" should read -- region using --.
Line 19, "as bit" should read -- as a bit --.

Column 6,
Line 56, "threshold the" should read -- threshold, the --.

Column 8,
Line 19, "threshold the" should read -- threshold, the --.

Signed and Sealed this

Eighteenth Day of January, 2005

JON W. DUDAS
*Director of the United States Patent and Trademark Office*